(12) United States Patent
Chopra et al.

(10) Patent No.: US 8,452,679 B2
(45) Date of Patent: May 28, 2013

(54) FINANCIAL STATEMENT ANALYZER

(75) Inventors: Amit Chopra, New Delhi (IN); Rachna Gambhir, New Delhi (IN); Shane Prakash Masih, Gurgaon (IN); Ashu Chugh, Gurgaon (IN); Prashant A. Bidkar, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/218,638

(22) Filed: Aug. 26, 2011

(65) Prior Publication Data

US 2013/0054300 A1    Feb. 28, 2013

(51) Int. Cl.
*G06Q 40/00* (2012.01)
*G06Q 10/00* (2012.01)

(52) U.S. Cl.
CPC .............. *G06Q 40/00* (2013.01); *G06Q 10/00* (2013.01)
USPC ........................................... 705/35; 705/7.25

(58) Field of Classification Search
None
See application file for complete search history.

(56) References Cited

U.S. PATENT DOCUMENTS

| | | | |
|---|---|---|---|
| 6,336,094 B1 * | 1/2002 | Ferguson et al. | 705/35 |
| 6,856,972 B1 * | 2/2005 | Yun et al. | 705/36 R |
| 6,968,316 B1 * | 11/2005 | Hamilton | 705/36 R |
| 7,197,474 B1 * | 3/2007 | Kitts | 705/7.31 |
| 7,469,226 B2 * | 12/2008 | Escher | 705/36 R |
| 7,606,766 B2 * | 10/2009 | Anderson et al. | 705/40 |
| 7,756,732 B2 * | 7/2010 | McLean et al. | 705/7.37 |
| 7,788,146 B2 * | 8/2010 | McCarthy, Jr. | 705/35 |
| 7,836,394 B2 | 11/2010 | Linder | |
| 7,882,137 B2 * | 2/2011 | Lepman | 707/793 |
| 7,925,557 B1 * | 4/2011 | Ficery et al. | 705/35 |
| 7,962,396 B1 * | 6/2011 | Calil et al. | 705/36 R |
| 7,991,672 B2 * | 8/2011 | Crowder | 705/36 R |
| 2001/0044762 A1 * | 11/2001 | Nault | 705/30 |
| 2002/0065752 A1 * | 5/2002 | Lewis | 705/35 |
| 2003/0036988 A1 * | 2/2003 | James | 705/35 |
| 2003/0055696 A1 * | 3/2003 | Tsukishima et al. | 705/7 |
| 2003/0069822 A1 * | 4/2003 | Ito et al. | 705/36 |
| 2003/0172014 A1 * | 9/2003 | Quackenbush et al. | 705/35 |
| 2003/0195780 A1 * | 10/2003 | Arora et al. | 705/7 |
| 2004/0039676 A1 * | 2/2004 | Trainer | 705/36 |
| 2004/0073467 A1 * | 4/2004 | Heyns et al. | 705/7 |
| 2004/0122756 A1 * | 6/2004 | Creeden et al. | 705/35 |
| 2004/0133439 A1 * | 7/2004 | Noetzold et al. | 705/1 |
| 2004/0172319 A1 * | 9/2004 | Eder | 705/7 |
| 2005/0004854 A1 * | 1/2005 | Jones et al. | 705/35 |
| 2005/0004857 A1 * | 1/2005 | Schwarz et al. | 705/36 |
| 2005/0065839 A1 * | 3/2005 | Benson et al. | 705/10 |
| 2005/0125318 A1 * | 6/2005 | Jameson | 705/30 |
| 2005/0125322 A1 * | 6/2005 | Lacomb et al. | 705/35 |

(Continued)

*Primary Examiner* — Gregory Johnson
(74) *Attorney, Agent, or Firm* — Weiss & Arons LLP; Michael A. Springs, Esq.

(57) ABSTRACT

Apparatus, methods and media for providing a supply chain link performance change indicator. The apparatus may include, and the methods and media may involve a processor module, a receiver module and an output device. The processor module may provide to a user a vector selection control. The receiver module may receive financial data corresponding to the supply chain link. The financial data may include a plurality of vectors. The receiver may receive via the vector selection control a first vector identifier corresponding to a first vector in the plurality of vectors and a second vector identifier corresponding to a second vector in the plurality of vectors. The output device may provide to the user a first supply chain link performance change indicator corresponding to the first vector and a second supply chain link performance change indicator corresponding to the second vector.

21 Claims, 10 Drawing Sheets

U.S. PATENT DOCUMENTS

| | | |
|---|---|---|
| 2005/0154628 A1* | 7/2005 | Eckart et al. ............... 705/10 |
| 2005/0209942 A1* | 9/2005 | Ballow et al. ............... 705/35 |
| 2005/0209943 A1* | 9/2005 | Ballow et al. ............... 705/35 |
| 2005/0222929 A1* | 10/2005 | Steier et al. ............... 705/35 |
| 2005/0246259 A1* | 11/2005 | Lavoie et al. ............... 705/35 |
| 2005/0267828 A1* | 12/2005 | Baron et al. ............... 705/35 |
| 2005/0273404 A1* | 12/2005 | Ostergard ............... 705/35 |
| 2005/0288939 A1* | 12/2005 | Peled et al. ............... 705/1 |
| 2006/0010057 A1* | 1/2006 | Bradway et al. ............... 705/35 |
| 2006/0059063 A1* | 3/2006 | LaComb et al. ............... 705/35 |
| 2006/0167772 A1* | 7/2006 | Zilberman ............... 705/35 |
| 2006/0178963 A1* | 8/2006 | Masuyama ............... 705/35 |
| 2007/0033127 A1* | 2/2007 | Masuyama et al. ......... 705/36 R |
| 2007/0038558 A1* | 2/2007 | Nakatsugawa et al. ......... 705/38 |
| 2007/0055596 A1* | 3/2007 | Yankovich et al. ............... 705/35 |
| 2007/0136115 A1* | 6/2007 | Senturk Doganaksoy et al. ............... 705/7 |
| 2007/0226099 A1* | 9/2007 | Senturk-Doganaksoy et al. ............... 705/35 |
| 2007/0244775 A1* | 10/2007 | Linder ............... 705/35 |
| 2007/0288336 A1* | 12/2007 | Malaviya et al. ............... 705/35 |
| 2008/0235153 A1* | 9/2008 | Tombs et al. ............... 705/36 R |
| 2009/0138307 A1* | 5/2009 | Belcsak et al. ............... 705/7 |
| 2009/0259580 A1* | 10/2009 | Castiglione et al. ............... 705/35 |
| 2010/0094685 A1* | 4/2010 | Young ............... 705/10 |
| 2010/0121746 A1* | 5/2010 | Schoenfeld et al. ............... 705/30 |
| 2010/0161471 A1* | 6/2010 | Fendick ............... 705/35 |
| 2010/0250307 A1* | 9/2010 | Hollas ............... 705/7 |
| 2011/0119107 A1* | 5/2011 | King ............... 705/7.28 |
| 2011/0153480 A1* | 6/2011 | Zinow et al. ............... 705/35 |
| 2011/0218837 A1* | 9/2011 | Haynes et al. ............... 705/7.31 |
| 2012/0023006 A1* | 1/2012 | Roser et al. ............... 705/38 |
| 2012/0185373 A1* | 7/2012 | Grody ............... 705/37 |

* cited by examiner

BALANCE SHEET DRIVERS

BALANCE SHEET DRIVERS (K-$)

{ LINE ITEM AS A % OF BALANCE SHEET SIZE  10%

{ % CHANGE (OVER THE PERIODS)  5%

|  | 12/31/2010 | 12/31/2009 | ACTUAL CHANGE | % CHANGE |
|---|---|---|---|---|
| TOTAL CURRENT ASSETS | 14,543 | 14,543 | 11,943 | 82% |
| TOTAL NON CURRENT ASSETS | 87,124 | 87,124 | 3,607 | 4% |
| NET FILED ASSETS | 10,059 | 10,059 | 2,715 | 27% |
| NET INTANGIBLES | 74,974 | 74,974 | 1,707 | 2% |
| TOTAL ASSETS | 101,672 | 101,672 | 15,550 | 15% |
| TOTAL CURRENT LIABILITIES | 14,578 | 14,578 | 6,094 | 42% |
| TOTAL NON CURRENT LIABILITIES | 40,913 | 40,913 | 6,490 | 16% |
| TOTAL LIABILITIES | 55,591 | 55,591 | 12,584 | 23% |
| NET WORTH OWNERS EQUITY | 445,079 | 445,079 | 2,953 | 6% |

|  | 12/31/2009 | 12/31/2008 | ACTUAL CHANGE | % CHANGE |
|---|---|---|---|---|
| TOTAL CURRENT ASSETS | 14,543 | 15,728 | -1,150 | -3% |
| TOTAL NON CURRENT ASSETS | 87,124 | 104,787 | -17,663 | -17% |
| NET FILED ASSETS | 10,059 | 10,369 | -310 | -3% |
| NET INTANGIBLES | 74,974 | 82,208 | -7,234 | -9% |
| TOTAL ASSETS | 101,672 | 120,515 | -18,343 | -16% |
| TOTAL CURRENT LIABILITIES | 14,678 | 13,044 | 1,634 | 13% |
| TOTAL NON CURRENT LIABILITIES | 40,913 | 60,471 | -19,558 | -32% |
| TOTAL LIABILITIES | 55,591 | 73,515 | -17,924 | -24% |
| NET WORTH OWNERS EQUITY | 445,079 | 2,968 | 43,111 | 1453% |

DRIVERS

| ROW LABELS | 12/31/2010 | 12/31/2009 | ACTUAL CHANGE | % CHANGE |
|---|---|---|---|---|
| ACCTS NOTES REC-TRADE | 21,412 | 10,055 | 11,327 | 112% |
| LONG TERM DEBT-BANK | 12,500 | 9,609 | 2,891 | 30% |
| LONG TERM DEBT-RELATED PARTY | 22,447 | 20,600 | 1,847 | 9% |
| Z- NO MORE DRIVERS | 0 | 0 |  | 0% |
| GRAND TOTAL |  |  |  |  |

DRIVERS

| ROW LABELS | 12/31/2009 | 12/31/2008 | ACTUAL CHANGE | % CHANGE |
|---|---|---|---|---|
| ACCTS NOTES REC-TRADE | 10055 | 12192 | -2107 | -17% |
| INTANGIBLES-GOODWILL | 22369 | 25051 | -2682 | -11% |
| LONG TERM DEBT-BANK | 9609 | 15515 | -5906 | -38% |
| Z- NO MORE DRIVERS | 0 | 0 |  | 0% |
| GRAND TOTAL |  |  |  |  |

FIG. 8

*COMPARATIVE INCOME STATEMENT*

(K-$)

| | PERIOD 1 | MARGINS | PERIOD 2 | MARGINS | PERIOD 3 | MARGINS | PERIOD 4 | MARGINS | %CHANGE P1 VS P2 | %CHANGE MARGINS | %CHANGE P2 VS P3 | %CHANGE MARGINS | %CHANGE P3 VS P4 | %CHANGE MARGINS | P4 VS P5 | MARGINS |
|---|---|---|---|---|---|---|---|---|---|---|---|---|---|---|---|---|
| | 3/31/2011 | | 12/31/2010 | | 3/31/2010 | | 12/31/2009 | | | | | | | | | |
| SALES | 929 | | 3,651 | | 910 | | 3,762 | | | | | | | | | |
| SALES ADJUSTMENTS | 0 | | 0 | | 0 | | 0 | | | | | | | | | |
| NET SALES | 929 | 100.00 | 3,651 | 100.00 | 910 | 100.00 | 3,762 | 100.00 | | | | | | | | |
| COST OF SALES | 372 | 40.04 | 1,490 | 40.81 | 383 | 42.09 | 1,565 | 41.60 | (1.88) | (3.03) | (1.90) | (4.86) | (1.90) | | | |
| COST OF SALES-DEPRC | 0 | 0.00 | 0 | 0.00 | 0 | 0.00 | 0 | 0.00 | | | | | | | | |
| TOTAL COGS | 372 | 40.04 | 1,490 | 40.81 | 383 | 42.09 | 1,565 | 41.60 | | | | | | | | |
| GROSS PROFIT | 557 | 59.96 | 2,161 | 59.19 | 527 | 57.91 | 2,197 | 58.40 | 1.30 | 2.21 | 3.53 | 1.35 | | | | |
| OPERATING EXPENSE | 0 | 0.00 | 0 | 0.00 | 0 | 0.00 | 0 | 0.00 | | | | | | | | |
| SG&A EXPENSE | 332 | 35.74 | 1,042 | 28.54 | 336 | 36.92 | 1,025 | 27.25 | 25.22 | (2270) | (3.21) | 4.75 | | | | |
| OPERATING INCOME | 0 | 0.00 | 0 | 0.00 | 0 | 0.00 | 0 | 0.00 | | | | | | | | |
| OFFICERS COMP | 0 | 0.00 | 0 | 0.00 | 0 | 0.00 | 0 | 0.00 | | | | | | | | |
| LEASE EXPENSE | 0 | 0.00 | 203 | 5.56 | 0 | 0.00 | 198 | 5.26 | (100.00) | 100.00 | | | 5.64 | | | |
| DEPRECIATION | 204 | 21.96 | 781 | 21.38 | 225 | 24.73 | 823 | 21.83 | 265 | (13.48) | (11.19) | (2.22) | | | | |
| AMORTIZATION | 13 | 1.40 | 154 | 4.22 | 14 | 1.64 | 157 | 4.17 | (68.82) | 174.17 | (9.04) | 1.07 | | | | |
| WAGES & SALARIES | 0 | 0.00 | 0 | 0.00 | 0 | 0.00 | 0 | 0.00 | | | | | | | | |
| TOTAL OPERATING EXPENSES | 549 | 59.10 | 2,180 | 59.71 | 576 | 63.19 | 2,203 | 58.56 | (1.03) | (5.50) | (6.47) | 1.96 | | | | |
| OPERATING INCOME | 8 | 0.86 | (19) | (0.52) | (48) | (5.27) | (6) | (0.16) | (266.48) | (90.13) | (116.33) | 226.29 | | | | |
| INTEREST INCOME | 0 | 0.00 | 1 | 0.03 | 0 | 0.00 | 2 | 0.05 | (100.00) | 100.00 | (100.00) | (48.48) | | | | |
| INTEREST EXPENSE | 156 | 16.79 | 586 | 16.05 | 141 | 15.49 | 595 | 15.82 | 462 | 3.56 | 8.38 | 1.48 | | | | |
| NON-CASH INCOME | 12 | 1.29 | 0 | 0.00 | 15 | 1.65 | 14 | 0.37 | 100.00 | (100.00) | (2164) | (100.00) | | | | |
| NON-CASH EXPENSE | 27 | 2.91 | 67 | 1.84 | 16 | 1.76 | 59 | 1.57 | 58.37 | 4.37 | 65.30 | 17.01 | | | | |
| OTHER INCOME | 3 | 0.32 | 21 | 0.58 | 7 | 0.77 | 27 | 0.72 | (43.86) | (25.23) | (58.02) | (19.86) | | | | |
| INCOME FROM SUBS | 0 | 0.00 | 0 | 0.00 | 0 | 0.00 | 0 | 0.00 | | | | | | | | |

FIG. 9A

*COMPARATIVE INCOME STATEMENT (CONTINUED)*
*(K-$)*

| | PERIOD 1 | | PERIOD 2 | | PERIOD 3 | | PERIOD 4 | | %CHANGE P1 VS P2 | %CHANGE MARGINS | %CHANGE P2 VS P3 | %CHANGE MARGINS | %CHANGE P3 VS P4 | %CHANGE MARGINS | %CHANGE P4 VS P5 | %CHANGE MARGINS |
|---|---|---|---|---|---|---|---|---|---|---|---|---|---|---|---|---|
| | 3/31/2011 | MARGINS | 12/31/2010 | MARGINS | 3/31/2010 | MARGINS | 12/31/2009 | MARGINS | | | | | | | | |
| G/L ON ASSETS | 922 | 0.22 | (4) | (0.11) | 0 | 0.00 | 0 | 0.00 | (296.50) | | | | | | | |
| OTHER EXPENSE | 0 | 0.00 | 0 | 0.00 | (54) | (6.93) | 0 | 0.00 | | | | 100.00 | | | | |
| EXTRAORDINARY GL | (20) | (215) | (58) | (1.52) | 0 | 0.00 | 0 | 0.00 | 33.22 | (7277) | (6372) | | | | | |
| INCOME TAXES | 27 | 291 | 0 | 0.00 | 1 | 0.11 | 1 | 0.03 | 100.00 | (100.00) | (100.00) | 2544.78 | | (100.00) | | |
| INCOME TAX CREDIT | 0 | 0.00 | 249 | | 0 | 0.00 | 0 | 0.00 | (100.00) | 100.00 | | | | 100.00 | | |
| AFTER TAX INCOME | 0 | 0.00 | 0 | 0.00 | 0 | 0.00 | 0 | 0.00 | | | | | | | | |
| MINORITY INTEREST | 0 | 0.00 | 0 | 0.00 | 0 | 0.00 | 0 | 0.00 | | | | | | | | |
| AFTER TAX NON-CASH | 0 | 0.00 | 0 | 0.00 | 0 | 0.00 | 0 | 0.00 | | | | | | | | |
| AFTER TAX EXPENSE | (205) | (22.07) | (622) | (17.04) | (238) | (26.15) | (618) | (16.43) | | | | | | | | |
| NET PROFIT/LOSS | | | | | | | | | 29.53 | 34.88 | | 15.83 | | 3.17 | | |

FIG. 9B

SUMMARY TABLES
FA DATA — 1002

BALANCE SHEET (K-$)

| | 1004 | 1006 | 1008 | 1010 | 1012 CLOSE |
|---|---|---|---|---|---|
| STATEMENT DATE | 3/31/2011 | 12/31/2010 | 3/31/2010 | 12/31/2009 | 12/31/2008 |
| MONTHS | 3 | 12 | 3 | 12 | 12 |
| AUDIT METHOD | 10-Q | 10-K | 10-Q | 10-K | 10-K |
| TOTAL LIABILITIES | 9,067.00 | 8,512.00 | 8,441.00 | 8,571.00 | 8,613.00 |
| TOTAL INTANGIBLES | 1,776.00 | 1,798.00 | 1,870.00 | 1,896.00 | 1,991.00 |
| NET WORTH | (265.00) | (157.00) | 221.00 | 491.00 | 1,021.00 |
| DEBT/NET WORTH (X) | (34.22) | (84.22) | 38.19 | 17.46 | 8.44 |
| WORKING CAPITAL | 306 | 16 | 100 | (260) | 190 |
| CURRENT RATIO (X) | 1.26 | 1.02 | 1.11 | 0.83 | 1.18 |
| QUICK RATIO (X) | 1.16 | 0.92 | 1.00 | 0.76 | 1.10 |
| FUNDED DEBT/EBITDA (X) | 7.85 | 7.04 | 8.41 | 6.63 | 5.73 |

INCOME STATEMENT (K-$)

| | | | | | |
|---|---|---|---|---|---|
| STATEMENT DATE | 3/31/2011 | 12/31/2010 | 3/31/2010 | 12/31/2009 | 12/31/2008 |
| MONTHS | 3 | 12 | 3 | 12 | 12 |
| AUDIT METHOD | 10-Q | 10-K | 10-Q | 10-K | 10-K |
| REVENUE | 929 | 3,681 | 910 | 3,762 | 4,801 |
| REVENUE GROWTH (%) | 0.58 | 1.58 | 0.44 | 1.71 | NON |
| GROSS PROFITS/<LOSS> | 557 | 2,161 | 527 | 2,197 | 2,492 |
| GROSS MARGINS (%) | 59.96 | 59.19 | (40) | 58.40 | 57.94 |
| OPERATING PROFITS/<LOSS> | 0 | (19) | (8.27) | (6) | 106 |
| OPERATING PROFIT MARGIN (%) | 0.86 | (0.52) | (238) | (0.16) | 2.46 |
| NET PROFIT/<LOSS> | (205) | (622) | (26.15) | (618) | (318) |
| NET PROFIT MARGIN (%) | (22.07) | (17.04) | (0.34) | (16.43) | (7.39) |
| FIXED CHANGE COVERAGE RATIO (X) | 0.05 | 0.23 | 0.23 | 0.24 | 0.39 |
| DIVIDENDS | 0 | 0 | 0 | 0 | 0 |
| DIVIDEND PAYOUT RATE (%) | 0.00 | 0.00 | 0.00 | 0.00 | 0.00 |

CASH CONVERSION CYCLE (K-$)

| | | | | | |
|---|---|---|---|---|---|
| STATEMENT DATE | 3/31/2011 | 12/31/2010 | 3/31/2010 | 12/31/2009 | 12/31/2008 |
| INVENTORY DAYS | 0 | 0 | 0 | 0 | 0 |
| RECEIVABLE DAYS | 29 | 26 | 30 | 31 | 33 |
| PAYABLE DAYS | 80 | 81 | 82 | 85 | 74 |
| CASH CONVERSION CYCLE | (51) | (54) | (52) | (54) | (41) |

1014 — (Balance Sheet section)
1016 — (Income Statement section)
1018 — (Cash Conversion Cycle section)

FIG. 10

FINANCIAL STATEMENT ANALYZER

FIELD OF TECHNOLOGY

This application relates to supply chain management. More specifically, the application relates to characterizing a supply chain link based on financial information related to the link.

BACKGROUND OF THE INVENTION

An entity that procures goods and services from a supply chain may be exposed to risk based on the financial stability of links, or suppliers, in the supply chain. Financial information about a link may relate to the financial stability of the link. Although abundant financial information is available, it is typically difficult to organize and interpret the information in a manner that validates financial stability. It also is typically difficult to identify particular items of financial information that are likely to support financial analysis.

It therefore would be desirable to provide apparatus, methods, and computer readable media for providing a supply chain link performance change indicator.

SUMMARY OF THE INVENTION

Apparatus, methods and media for providing a supply chain link performance change indicator are provided. The performance change indicator may represent a performance change. The performance change may be an actual change. The performance change may be a modeled change. The performance change may be positive. The performance change may be negative. The apparatus may include, and the methods and media may involve a processor module, a receiver module and an output device. The processor module may provide to a user a vector selection control. The receiver module may receive financial data corresponding to the supply chain link. The financial data may correspond to a financial statement. The financial data may include a plurality of vectors. The receiver may receive via the vector selection control a first vector identifier corresponding to a first vector in the plurality of vectors and a second vector identifier corresponding to a second vector in the plurality of vectors. The output device may provide to the user a first supply chain link performance change indicator corresponding to the first vector and a second supply chain link performance change indicator corresponding to the second vector.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8 shows still other illustrative information in accordance with the principles of the invention;

FIG. 9 shows still other illustrative information in accordance with the principles of the invention;

FIG. 10 shows still other illustrative information in accordance with the principles of the invention.

DETAILED DESCRIPTION OF THE INVENTION

Figure 1:
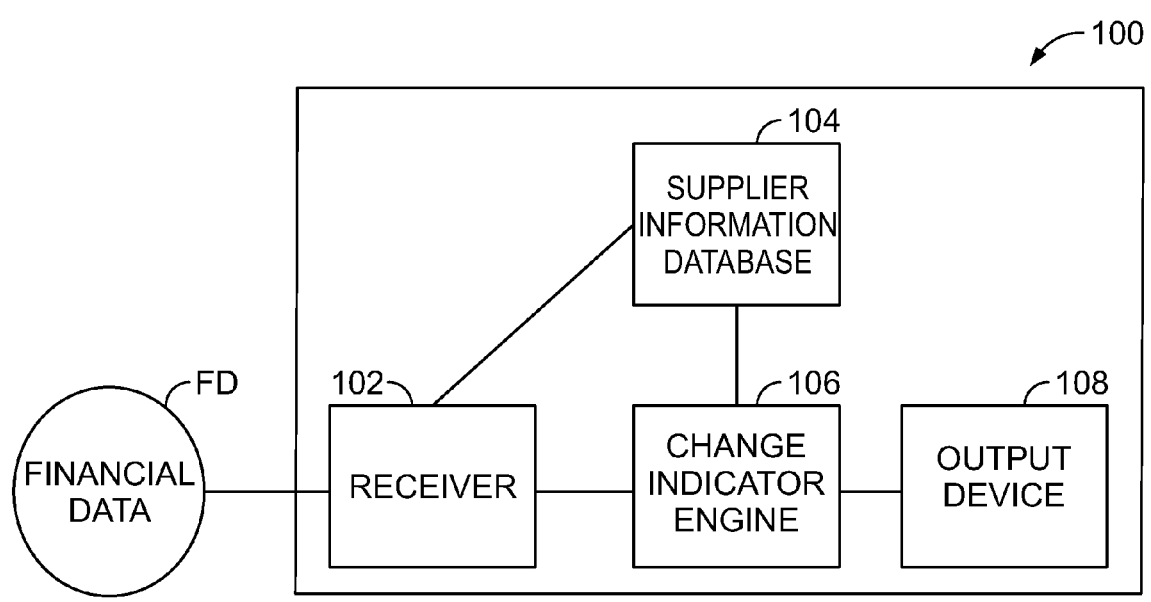
FIG. 1 shows illustrative apparatus in accordance with the principles of the invention.

Apparatus, methods and media are provided for providing a supply chain link performance change indicator. The apparatus may include, and the methods and media may involve, a receiver module, a processor module and an output device. The receiver module may receive financial data corresponding to the supply chain link. The financial data may include a plurality of vectors. The processor module may provide to a user a vector selection control. The receiver module may receive via the vector selection control a first vector identifier corresponding to a first vector in the plurality of vectors and a second vector identifier corresponding to a second vector in the plurality of vectors. The output device may provide to the user a first supply chain link performance change indicator corresponding to the first vector and a second supply chain link performance change indicator corresponding to the second vector.

Table 1 shows illustrative supply chain links for different industries.

TABLE 1

Illustrative supply chain links for different industries.

| Industry | Link1 | Link2 | Link3 | ... | LinkN |
|---|---|---|---|---|---|
| Automobile manufacturing | Ore producer | Metal refiner | Part supplier | ... | Assembler |
| Consumer plastics | Petroleum refiner | Resin manufacturer | Molder | ... | Assembler |
| Consumer electronics | Raw silica producer | Chip manufacturer | IC fabricator | ... | Circuit programmer |
| Financial services | Entity seeking debt | Relationship manager | Financial analyst | ... | Loan approver |

It will be understood that an indicator of change of the financial stability of any business or individual entity may be provided in a manner that is analogous to the manner described herein in connection with supply chain links.

For example, the indicator may be used to understand and interpret financial performance trends of an entity, determine creditworthiness of an entity, determine the likelihood that a borrowing entity will repay a debt, examine entity credit limits and portfolios for adherence to policies and procedures, appropriate risk ratings, and sound underwriting and determine any other suitable financial health characteristics of the entity. The entity may be a supplier. The entity may not be a supplier. The entity may be corporate, individual, commercial, private or public.

The financial data may include balance sheet information, income statement information or any other suitable information. The financial data may be obtained from any suitable source. For example, the financial data may be obtained from a company's accountant, a company website, a government regulatory source, such as Securities and Exchange Commission records.

The financial data may be preprocessed by an application such as that available under the trademark MOODY'S RISK ANALYST from Moody's Investors Service, Inc., Boston, Mass. The preprocessor may output information that may include "financial information," "consolidated information," "derived information" or any other suitable information. "Financial information" may be a line-by-line reproduction of the financial data. "Consolidated information" may include consolidated information such as "cash," which may include cash/cash-equivalents, marketable securities, and other cash assets. "derived information" may include derived quantities such as ratios between financial data types.

Table 2 shows illustrative financial data types. One or more of the types may correspond to a balance sheet or income statement line item. A line item may be formulated as a vector that is defined by elements that correspond to financial data of the same type. Each element in the vector may represent a different time period.

TABLE 2

Illustrative financial data types.
Illustrative Financial Data Types

| Category A: Balance Sheet Data Types | Category B: Income Statement Data Types |
|---|---|
| Cash and Cash Equivalents | Revenues |
| Accounts Receivable | Cost of Sales |
| Time Deposits | Expenses |
| Inventories | Advertising |
| Prepaid Expenses | Bank & Credit Card Fees |
| Investment Securities | Depreciation/Amortization Fixed Assets |
| Other Current Assets | Restructuring Charge |
| Property, Plant and Equipment ("PPE") | Salaries and Wages Entertainment |
| Investment Securities | Insurance |
| Investments in Associates | Legal & Professional Services |
| Intangible Assets | License fees |
| Goodwill | Printing, Postage & Stationery |
| Deferred Tax Assets | Rent |
| Lease Receivable | Rental Mortgages And Fees |
| Other Non-Current Assets | Telephone/telecommunication Services |
| Accounts Payable | Utilities |
| Current Income Tax Payable | Interest Income |
| Current portion of Loans Payable | Interest Expense |
| Short-term Provisions | Total Expenses |
| Unearned Revenue | Extraordinary Gain/Loss |
| Deposits | Current Income Taxes |
| Other Current Liabilities | Net Income |
| Loans Payable | Other |
| Issued Debt Securities | |
| Deferred Tax Liabilities | |
| Provisions | |
| Lease Obligations | |
| Other Non-Current Liabilities | |
| Common Stock | |
| Preferred Stock | |
| Paid-in Capital | |
| Retained Earnings | |
| Revaluation Reserve | |
| Currency Translation | |
| Treasury Stock | |
| Accumulated Other Comprehensive Income | |
| Non-Controlling Interest | |
| Other | |

Table 3 shows other illustrative financial data types. The other financial data types may be included in the financial data. The other financial data types may be derived from the financial data.

TABLE 3

Other illustrative financial data types.

| Other Illustrative Financial Data Types | Example | Selected Illustrative Characteristics |
|---|---|---|
| Current Assets | Cash, A/R's, Inventory, Prepaid | Includes, for example, assets that may be liquidated within one year |
| Non-current Assets | Fixed Assets, LT Investments, Goodwill, Intangibles | Includes, for example, assets that may take more than a year for liquidation |
| Total Assets | Current Assets + Non-current assets | Sum of Current assets and Non-current assets |
| Current Liabilities | Overdraft, CPTLD, ST Loans Payable, AP-Trade, Accruals | Obligations that are due in one year |
| Non-current liabilities | LT Debt, Due to related party | Obligations that are due after a year |
| Total Liabilities | Current Liabilities + Non-current Liabilities | Sum of Current and Non-current liabilities |
| Funded Debt | Overdrafts, Loans, Debt, Subordinated debt, Deferred debt, Deferred Interest | Includes interest-bearing liabilities |
| EBITDA | Earnings before Interest, Taxes, Depreciation and Amortization. | Earnings before Interest, Taxes, Depreciation and Amortization. |
| EBIT | Earnings before Interest and Taxes | Earnings before Interest and Taxes |
| Quick Assets | Cash Equivalents, Marketable Securities and Trade Receivables | Cash Equivalents, Marketable Securities and Trade Receivables |
| Inventory in Days | Total Inventory/Cost of Goods Sold * 365; where Inventory includes Raw Materials, Work in Progress, Finished Goods, Other Inventory and Supplies | No. of days to convert inventory into sales |
| Receivables in Days | Accounts Receivable Trade/Sales * 365 | No. of days to collect money from debtors |
| Payables in Days | Accounts Payable Trade/Cost of Goods Sold * 365 | No. of days to pay to creditors |
| Cash Conversion Cycle | Receivable Days + Inventory Days – Payable Days | No. of days cash remains struck in the operations of the business. |
| Operating Expense | Cost of sales + operating expense | Summation of "Cost of Sales", "Operating Expenses" |
| Intangible Asset | Trademarks, Copyrights, Non-Compete Agreements, etc | Goodwill and other line items, for example, those related to Intangibles |
| Net Worth | Total assets – total liabilities | Shareholders' worth |
| Debt/Net Worth | Total Liabilities/Net Worth | Outsiders' fund vs. owners' fund |
| Cash Flow/Current Liabilities | Cash flow from Operating Activities/Current Liabilities | Cash flow, for example, from operating activities/current liabilities |
| Tangible Net Worth | Tangible Assets – Total Liabilities | May exclude Intangible assets |
| Debt/Tangible Net Worth | Total Liabilities/Tangible Net Worth | Total obligations/tangible net worth |
| Dividend Payout Ratio | Total Dividends/Net Profit – Loss * 100 | Where dividends includes common, preferred and S-Corp dividends |
| Fixed Charge Ratio ("FCCR") | EBIT + Rent/Rent + Interest | Earnings before interest and tax + fixed charges/fixed charges |
| Funded Debt/EBITDA | Funded Debt/EBITDA | Interest bearing liabilities/earnings before interest, tax + |

TABLE 3-continued

Other illustrative financial data types.

| Other Illustrative Financial Data Types | Example | Selected Illustrative Characteristics |
|---|---|---|
| | | depreciation and amortization |
| Working Capital | Total Current Assets – Total Current Liabilities | Current assets to meet current obligations |

Table 4 shows illustrative financial data accounts receivable vector ("AR") for a supply chain link.

TABLE 4

Illustrative financial data vector AR.

| Illustrative Vector Name | Element 1 (AR$_1$) Period 3 Amount ($1,000) | Element 2 (AR$_2$) Period 2 Amount ($1,000) | Element 3 (AR$_3$) Period 1 Amount ($1,000) |
|---|---|---|---|
| Accounts Receivable ("AR") | 28,123 | 31,123 | 35,123 |

A financial data vector may include any suitable number of elements.

The receiver module may receive from the user a magnitude threshold. The output device may provide to the user: (1) a financial data vector magnitude filter control; and (2) a subset of the financial data that exceeds the magnitude threshold.

The magnitude threshold may be a value. A filter may compare a metric of the vector to the magnitude threshold. The metric may be a vector size. For example, the vector size may be the size of a vector element. For example, the metric of the accounts receivable vector in Table 4 may be a monetary value of one of elements AR$_1$, AR$_2$ or AR$_3$. The metric may be an average monetary value of the elements.

Equation 1 defines an illustrative average monetary value of AR.

$$\overline{AR} = \frac{\sum_{i=1}^{I} AR_i}{I} \quad \text{Eqn. 1}$$

The metric may be an absolute value of the monetary values of the elements. Equation 2 defines an illustrative absolute value of AR.

$$|AR| = \sqrt{\sum_{i=1}^{I} AR_i^2} \quad \text{Eqn. 2}$$

The metric may be a relative size. The relative size may be a quotient defined as a vector size divided by a balance sheet size. The balance sheet size may be total assets, for example, as identified in Table 3.

Table 5 shows an illustrative financial data rate vector for vector AR (shown in Table 4).

TABLE 5

Illustrative financial data rate vector ARR for vector AR (shown in Table 4).

| Illustrative Rate Vector Name | Rate 1 (ARR$_1$) (Period 3 Amount Less Period 2 Amount)/ (Number of periods) ($1,000) | Rate 2 (ARR$_2$) (Period 2 Amount Less Period 1 Amount)/ (Number of periods) ($1,000) | Rate 3 (ARR$_3$) (Period 1 Amount Less Previous Period Amount)/ (Number of periods) ($1,000) |
|---|---|---|---|
| Accounts Receivable Rate ("ARR") | –3 | –4 | N/A |

For example, Table 5 shows that Rate 1 is –$3,000, meaning that accounts receivable changed by $3,000 over the time between Period 2 and Period 3. The periods are annual quarters, but any other suitable length of time may be used.

The output device may provide to the user a financial data vector rate filter control. The receiver may receive from the user a rate threshold. The processor may remove from the subset financial data that does not exceed the rate threshold.

The rate threshold may be a value. A filter may compare a metric of the vector to the rate threshold. The metric may be a vector rate. For example, the vector rate may be the rate of change between periods represented by different vector elements. For example, the metric of the accounts receivable vector in Table 4 may be Rate 1 or 2, as shown in Table 5.

The metric may be an average monetary value of rates. Equation 3 defines an illustrative average monetary value of rate vector ARR (shown in Table 5).

$$\overline{ARR} = \frac{\sum_{i=1}^{I} ARR_i}{I} \quad \text{Eqn. 3}$$

The metric may be an absolute value of rate vector ARR (shown in Table 5). Equation 4 defines an illustrative absolute value of ARR.

$$|ARR| = \sqrt{\sum_{i=1}^{I} AR_i^2} \quad \text{Eqn. 4}$$

The metric may be a relative rate. The relative rate may be a quotient defined as the vector rate divided by a balance sheet rate. The balance sheet rate may be a rate of change of the balance sheet size.

The output device may provide to the user: (1) an income statement analysis control; and, (2) in response to receiving from the user an instruction to present income statement data, a change index that corresponds to a supply chain link financial change between a first time period and a second time period.

The processor module may formulate a margin vector by normalizing elements of a third vector of the plurality of vectors to corresponding elements of a fourth vector of the plurality of vectors. The output device may provide to the user a margin change vector having elements representing changes between elements of the margin vector. The margin change vector may include the change index.

Equation 5 defines an illustrative accounts receivable margin vector ARM (based on vector AR, shown in Table 1) that has elements ARM$_i$ corresponding to periods P$_i$ (i=1 . . . I). Accounts receivable margin vector ARM is depends on accounts receivable vector AR (shown in Table 4), an illustrative "third vector," and illustrative revenue vector R.

Table 6 shows illustrative revenue vector R, an illustrative "fourth vector," corresponding to accounts receivable vector AR (shown in Table 4).

TABLE 6

Illustrative revenue vector R.

| Illustrative Vector Name | Element 1 ($R_1$) Period 3 Amount ($1,000) | Element 2 ($R_1$) Period 2 Amount ($1,000) | Element 3 ($R_1$) Period 1 Amount ($1,000) |
|---|---|---|---|
| Revenue ("R") | 30,123 | 33,123 | 38,123 |

$$M_i = \frac{(AR_i/R_i) - (AR_{i-1}/R_{i-1})}{AR_{i-1}/R_{i-1}} \quad \text{Eqn. 5}$$

Table 7 shows illustrative accounts receivable margin vector ARM.

TABLE 7

Illustrative accounts receivable margin vector ARM.

| Illustrative Vector Name | Element 1 ($ARM_1$) Period 3, % | Element 2 ($ARM_2$) Period 2, % | Element 3 ($ARM_3$) Period 1, % |
|---|---|---|---|
| Accounts Receivable Margin Vector ("ARM") | −0.6 | 2.0 | — |

The receiver module may receive from the user a selection identifying the fourth vector.

The fourth vector may be a revenue vector.

The first vector may be the same as the third vector. The first vector may be the same as the fourth vector. The second vector may be the same as the third vector. The first vector may be the same as the fourth vector.

The processor module may formulate an actual change vector by calculating differences between elements of a third vector of the plurality of vectors. Table 8 shows illustrative financial data actual change vector ARAC for vector AR (shown in Table 4).

TABLE 8

Illustrative financial data actual change vector ARAC for vector AR (shown in Table 4).

| Illustrative Actual Change Vector Name | Actual Change 1 ($ARAC_1$) Period 3 Amount Less Period 2 Amount ($1,000) | Actual Change 2 ($ARAC_2$) Period 2 Amount Less Period 1 Amount ($1,000) | Actual Change 3 ($ARAC_3$) Period 1 Amount Less Previous Period Amount ($1,000) |
|---|---|---|---|
| Accounts Receivable Actual Change ("ARAC") | −3 | −4 | N/A |

The values of $ARAC_i$ (shown in Table 8) are the same as the values of $ARR_i$ (shown in Table 5), because the periods in Table 5 are unitary. If different periods were used in the rate vector, the rate vector elements would be different from the actual change vector elements.

The output device may provide to the user the actual change vector. The actual change vector may include the change index.

The receiver module may receive from the user a selection identifying the third vector.

The processor module may formulate a relative change vector by calculating relative differences between elements of a third vector of the plurality of vectors.

Equation 6 defines an illustrative relative change vector RC that has elements $RC_i$ corresponding to periods $P_i$ (i=1 ... I).

$$ARRC_i = \frac{AR_i - AR_{i-1}}{AR_{i-1}} \quad \text{Eqn. 6}$$

Table 9 shows illustrative financial data relative change vector ARRC for vector AR (shown in Table 4).

TABLE 9

Illustrative financial data relative change vector ARRC for vector AR (shown in Table 4).

| Illustrative Actual Change Vector Name | Relative Change 1 ($ARRC_1$) (Period 3 Amount Less Period 2 Amount)/(Period 2 Amount) (%) | Relative Change 2 ($ARRC_2$) (Period 2 Amount Less Period 1 Amount)/(Period 1 Amount) (%) | Relative Change 3 ($ARRC_3$) (Period 1 Amount Less Previous Period Amount)/(Previous Period Amount) (%) |
|---|---|---|---|
| Accounts Receivable Relative Change ("ARRC") | −9.6 | −11.4 | N/A |

The output device may provide to the user the relative change vector. The relative change vector may include the change index.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative apparatus 100 for providing a supply chain link performance change indicator. Apparatus 100 may include receiver 102, financial data database 104, change indicator engine 106 and output device 108.

Receiver 102 may receive financial data FD that corresponds to supplier S (not shown). Receiver 102 may pass financial data FD to supplier information database 104. Receiver 102 may pass financial data FD to change indicator engine 106.

Change indicator engine 106 may include a spreadsheet application such as that available under the trademark EXCEL from the Microsoft Corporation, Redmond, Wash., or any other suitable application.

Change indicator engine 106 may provide to output device 108 one or more indicator, control, vector, financial data subset or any other suitable information. Output device 108 may provide to a user one or more of the indicator, control, vector, financial data subset or other information suitable for providing a supply chain link performance change indicator.

Figure 2:
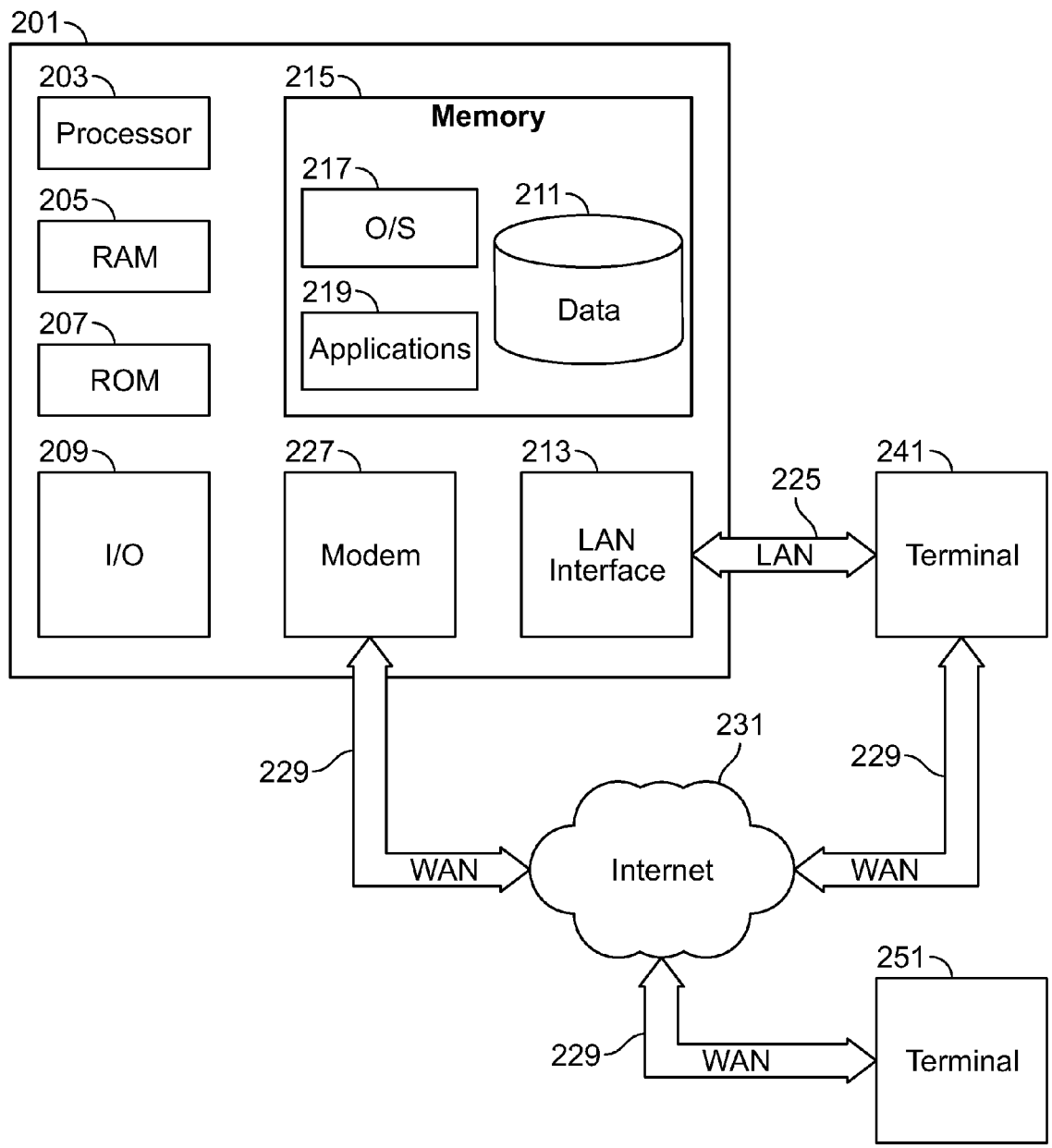
FIG. 2 shows illustrative apparatus that may be used in accordance with the principles of the invention.

FIG. 2 is a block diagram that illustrates a generic computing device 201 (alternatively referred to herein as a "server") that may be used in accordance with the principles of the invention. Server 201 may be included in any suitable apparatus that is shown or described herein. Server 201 may have a processor 203 for controlling overall operation of the server and its associated components, including RAM 205, ROM 207, input/output module 209, and memory 225.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 225 and/or storage to provide instructions to processor 203 for enabling server 201 to perform various functions. For example, memory 225 may store software used by server 201, such as an operating system 217, application programs 219, and an associated database 221. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 223. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, cell phone, Blackberry™, or any other suitable device for storing, transmitting and/or transporting relevant information.

Any information described above in connection with database 221, and any other suitable information, may be stored in memory 225.

One or more of applications 219 may include one or more algorithms that may be used to process financial data, receive from a user an instruction, and/or perform any other suitable tasks related to providing a supply chain link performance change indicator.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIGS. 3-12 show illustrative information views that may be provided by output device 108 (shown in FIG. 1).

Figure 3:
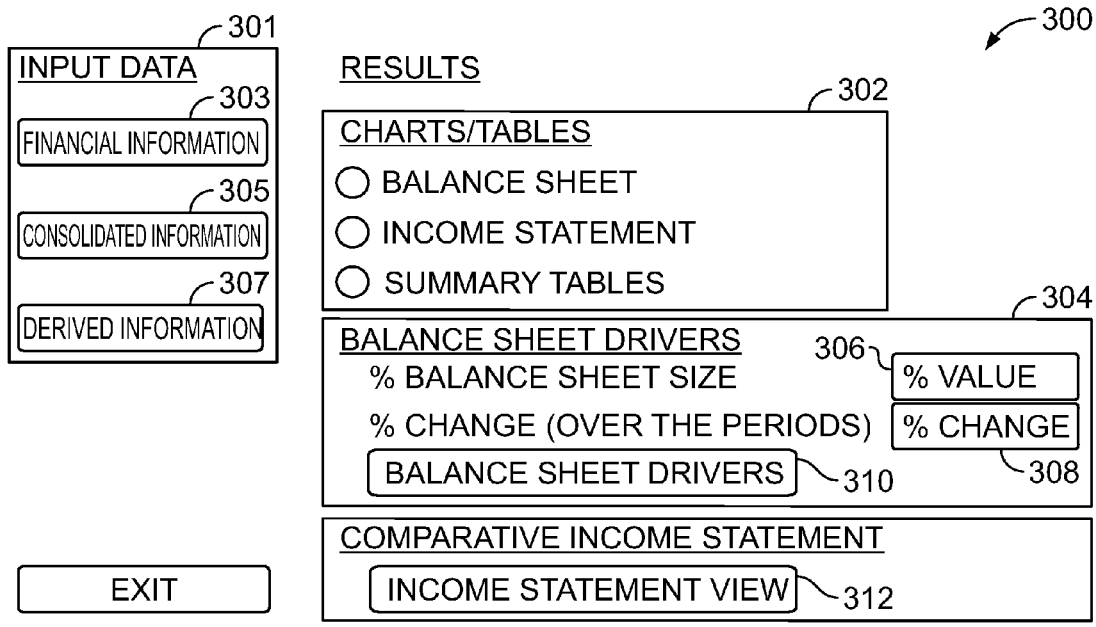
FIG. 3 shows illustrative information in accordance with the principles of the invention.

FIG. 3 shows illustrative view 300.

View 300 may include input selector 301. Input selector may be used to select different types of financial data for analysis by change indicator engine 106 (shown in FIG. 106). Input selector 301 may include control 303. A user may use control 303 to retrieve financial information for analysis. Input selector 301 may include control 305. A user may use control 305 to retrieve consolidated information for analysis. Input selector 301 may include control 307. A user may use control 307 to retrieve derived information for analysis.

View 300 may include control 302. A user may use control 302 to select a category, such as Category A or Category B (shown in Table 2) of data types. The user may elect balance sheet data types, income statement data types or summary tables including one or more of balance sheet data and income statement data.

View 300 may include filter control 304. The user may use control 304 to configure a view of the financial data that is limited to balance sheet "drivers." Balance sheet drivers are financial data vectors that conform to user-selected criteria. A criterion may be vector size relative to balance sheet size. A criterion may be vector rate of change from one financial data reporting period to another. After one or more criteria are selected, the user may obtain a view of vectors that conform to the criteria and are, thus, balance sheet drivers.

The user may use magnitude control 306 to eliminate from a balance sheet driver view financial data that does not exceed a size threshold. The user may use rate control 308 to eliminate from a balance sheet driver view financial data that does not exceed a rate threshold.

The user may use control 310 to obtain a view of the balance sheet drivers.

View 300 may include control 312. The user may use control 312 to configure a view of income statement vectors.

Figure 4:
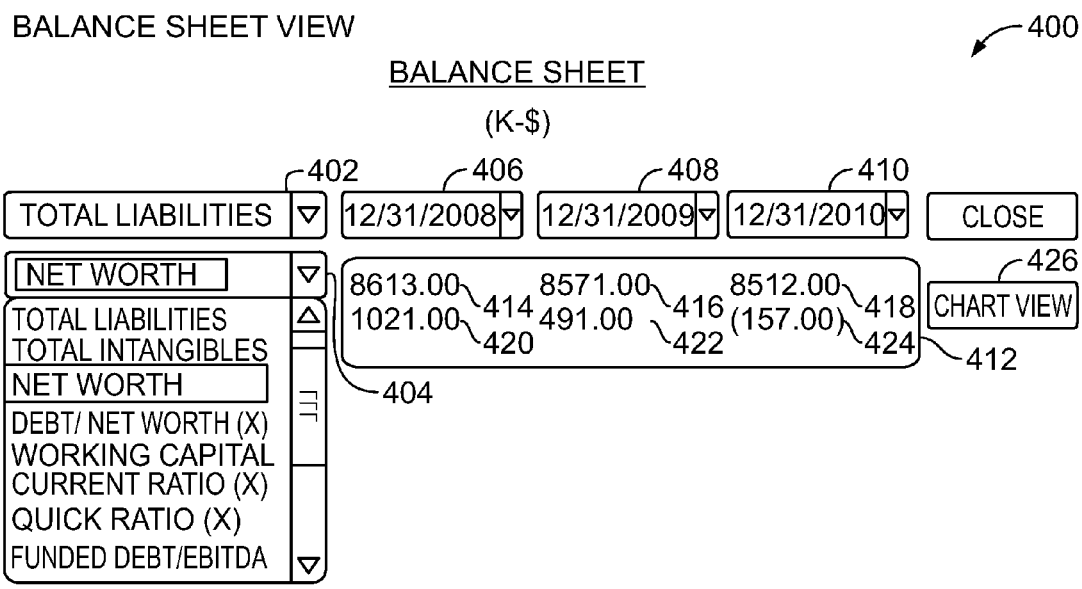
FIG. 4 shows other illustrative information in accordance with the principles of the invention.

FIG. 4 shows illustrative view 400. The user may obtain a view such as 400 by selecting "Balance Sheet" in control 302 (shown in FIG. 3). View 400 may include controls 402 and 404. A user may use controls 402 and 404 to select data vectors from financial data FD. The data vectors may correspond to data types shown in Table 2 or any other suitable data types. Information 400 may include more than two such controls. Control 402 is illustrated as having been used to select "Total Liabilities." Control 404 is illustrated as being used to select "Net Worth."

View 400 may include controls 406, 408 and 410. A user may use one or more of controls 406, 408 and 410 to select time periods. A time period may be a quarterly financial data reporting period, a semi-annual financial data reporting period, an annual financial data reporting period or any other suitable time period. View 400 may include more than three such controls. Control 406 is illustrated as having been used to select "12/31/2008. Control 408 is illustrated as having been used to select "12/31/2009." Control 410 is illustrated as having been used to select "12/31/2010.

View 400 may include output window 412. Output window 412 may show elements 414, 416 and 418 of the Total Liabilities vector. Output window 412 may show elements 420, 422 and 424 of the Net Worth vector.

Elements 414, 416, 418, 420, 422 and 424 may be indicators of supply chain link performance change.

View 400 may include control 426. Control 426 may provide a chart view of the indicators.

Figure 5:
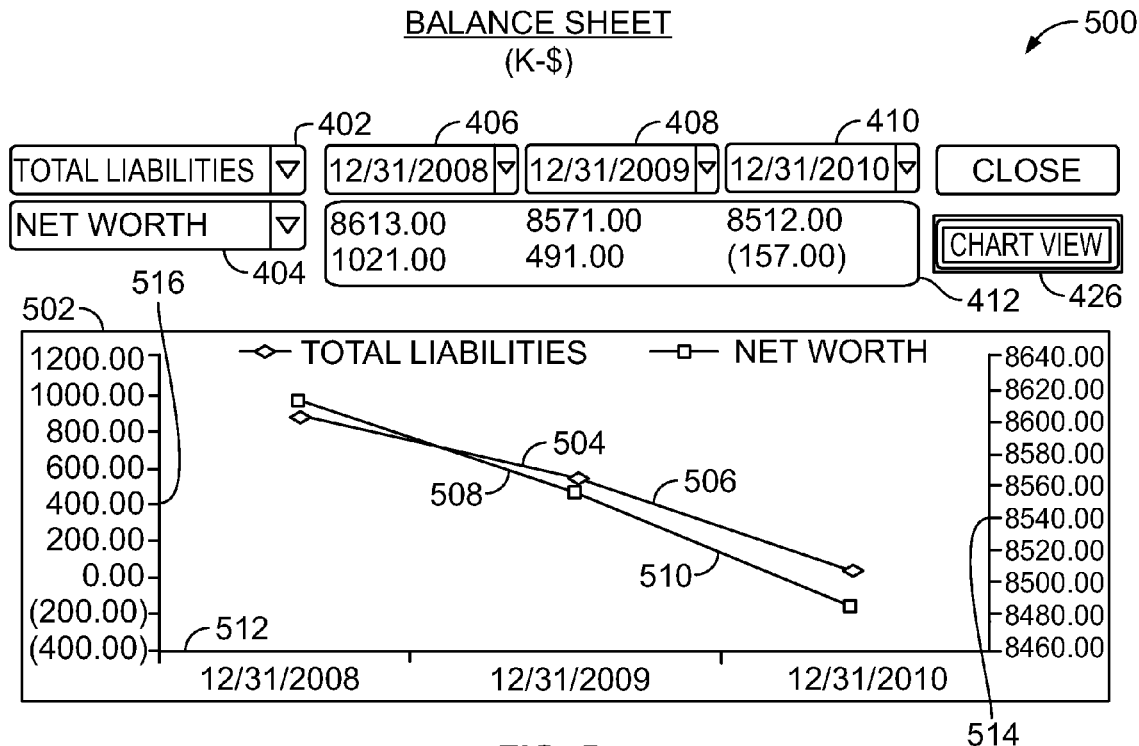
FIG. 5 shows yet other illustrative information in accordance with the principles of the invention.

FIG. 5 shows view 500. View 500 includes chart view 502 of the indicators shown in window 312.

Indicators 504 and 506 show declining total liabilities for supplier S during the time periods selected using controls 406, 408 and 410 (shown in FIG. 4). The time periods are plotted on horizontal axis 512. Total liability in dollars is shown on vertical axis 514. Net Worth in dollars is shown on vertical axis 516. A user may interpret one or both of indicators 504 and 506 in the formulation of a forecast about supplier S.

Indicators 508 and 510 show declining net worth for supplier S during the time periods selected using controls 406, 408 and 410 (shown in FIG. 4). The time periods are plotted on horizontal axis 512. Net worth in dollars is shown on vertical axis 516. A user may interpret one or both of indicators 508 and 510 in the formulation of a forecast about supplier S.

Figure 6:
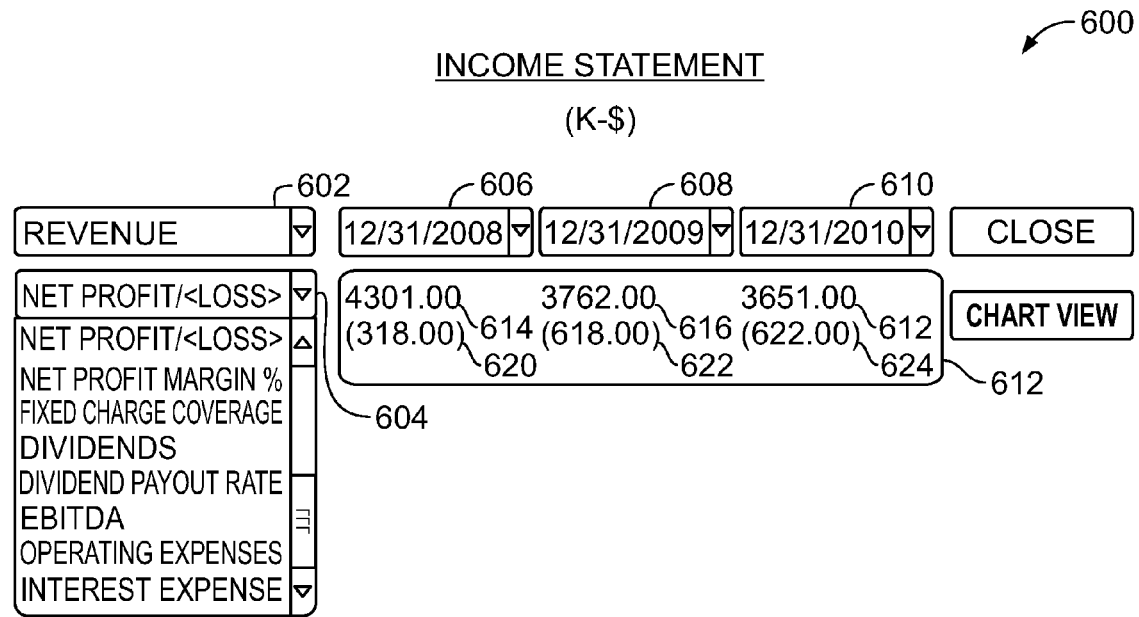
FIG. 6 shows still other illustrative information in accordance with the principles of the invention.

FIG. 6 shows illustrative view 600. The user may obtain a view such as 600 by selecting "Income Statement" in control 302 (shown in FIG. 3). View 600 may include controls 602 and 604. A user may use controls 602 and 604 to select data vectors from financial data FD. The data vectors may correspond to data types shown in Table 2 or any other suitable data types. Information 600 may include more than two such controls. Control 602 is illustrated as having been used to select "Revenue." Control 604 is illustrated as being used to select "Net Profit/<Loss>."

View 600 may include controls 606, 608 and 610. A user may use one or more of controls 606, 608 and 610 to select time periods. A time period may be a quarterly financial data reporting period, a semi-annual financial data reporting period, an annual financial data reporting period or any other suitable time period. View 600 may include more than three such controls. Control 606 is illustrated as having been used to select "12/31/2008. Control 608 is illustrated as having been used to select "12/31/2009." Control 610 is illustrated as having been used to select "12/31/2010.

View 600 may include output window 612. Output window 612 may show elements 614, 616 and 618 of the Revenue vector. Output window 612 may show elements 620, 622 and 624 of the Net Profit/<Loss> vector.

Elements 614, 616, 618, 620, 622 and 624 may be indicators of supply chain link performance change.

View 600 may include control 626. Control 626 may provide a chart view of the indicators.

Figure 7:
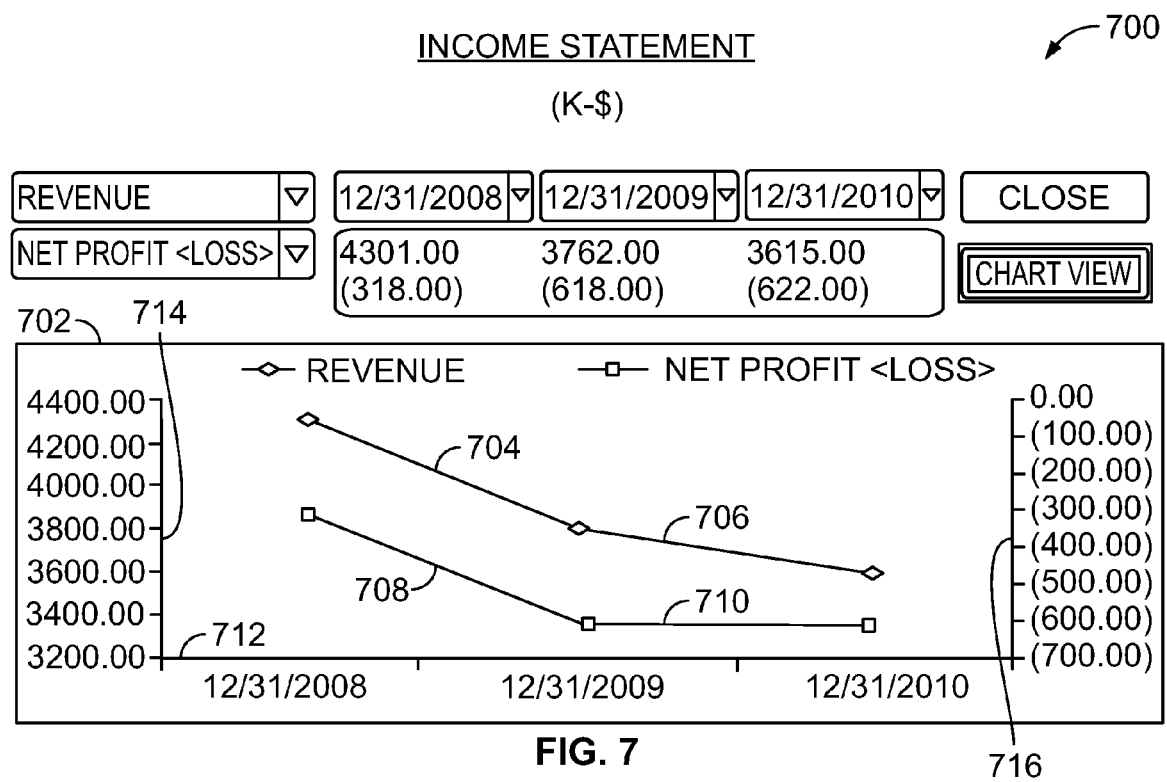
FIG. 7 shows still other illustrative information in accordance with the principles of the invention.

FIG. 7 shows view 700. View 700 includes chart view 702 of the indicators shown in window 612.

Indicators 704 and 706 show declining revenue for supplier S during the time periods selected using controls 606, 608 and 610 (shown in FIG. 6). The time periods are plotted on horizontal axis 712. Revenue in dollars is shown on vertical axis 714. Net Profit/<Loss> in dollars is shown on vertical axis 716. A user may interpret one or both of indicators 704 and 706 in the formulation of a forecast about supplier S.

Indicators 708 and 710 show respectively increasing and decreasing net loss for supplier S during the time periods selected using controls 606, 608 and 610 (shown in FIG. 6). The time periods are plotted on horizontal axis 712. Net Loss in dollars is shown on vertical axis 716. A user may interpret one or both of indicators 708 and 710 in the formulation of a forecast about supplier S.

FIG. 8 shows illustrative view 800. The user may obtain a view such as 800 using control 304 (shown in FIG. 3). View 800 may include filter information 802. Filter information 802 may show criteria provided by the user using controls 306 and 308.

View 800 may include table 804. Table 804 shows financial data vectors 806. Table 804 may include elements 808 and 810, for each of two time periods, for each of vectors 806. Table 804 may include actual changes 812 and percent changes 814 corresponding to changes between the elements from one of the time periods to the other.

Drivers section 826 shows vectors that conform to the criteria are thus identified as "drivers."

View 800 may include table 815. Table 815 shows financial data vectors. Table 815 may include elements 818 and 820, for each of two time periods, for each of vectors 806. Table 815 may include actual changes 822 and percent changes 824 corresponding to changes between the elements from one of the time periods to the other.

One or more of the time periods for which elements are shown in table 804 may be the same time period as one or more of the time periods for which elements are shown in table 815.

Drivers section 828 shows vectors that conform to the criteria are thus identified as "drivers."

FIG. 9 shows illustrative view 900. The user may obtain a view such as 900 using control 312 (shown in FIG. 3). View 900 may include financial data vectors 906. Vectors 906 may include elements 908, 910, 912 and 914 that correspond to four financial data reporting time periods. View 900 may include elements 916, 918, 920 and 922 of margin vectors that correspond to the financial data vectors. View 900 may include margin percent changes 924, 926, 928 and 930, which may correspond to percent changes between the financial data reporting time periods. The user may select, using one or more controls (not shown), the time periods for which the margin percent changes are calculated and displayed in view 900.

FIG. 10 shows illustrative view 1000. The user may obtain a view such as 1000 by selecting "Summary Tables" using control 302 (shown in FIG. 3). View 1000 may include financial data vectors 1002. View 1000 may include, for each of vectors 1002, elements 1004, 1006, 1008, 1010 and 1012. Elements 1004, 1006, 1008, 1010 and 1012 may correspond to financial data reporting periods. View 1000 may include sections 1014, 1016 and 1018. Section 1014 may include balance sheet type data vectors. Section 1016 may include income statement type data vectors. Section 1018 may include cash conversion cycle type data vectors.

Processes in accordance with the principles of the invention may include one or more features of the processes illustrated in FIGS. 3-10. For the sake of illustration, the steps of the illustrated processes will be described as being performed by a "system." The "system" may include one or more of the features of the apparatus that are shown in FIGS. 1-2 and/or any other suitable device or approach. The "system" may be provided by an entity. The entity may be an individual, an organization or any other suitable entity.

Figure 11:
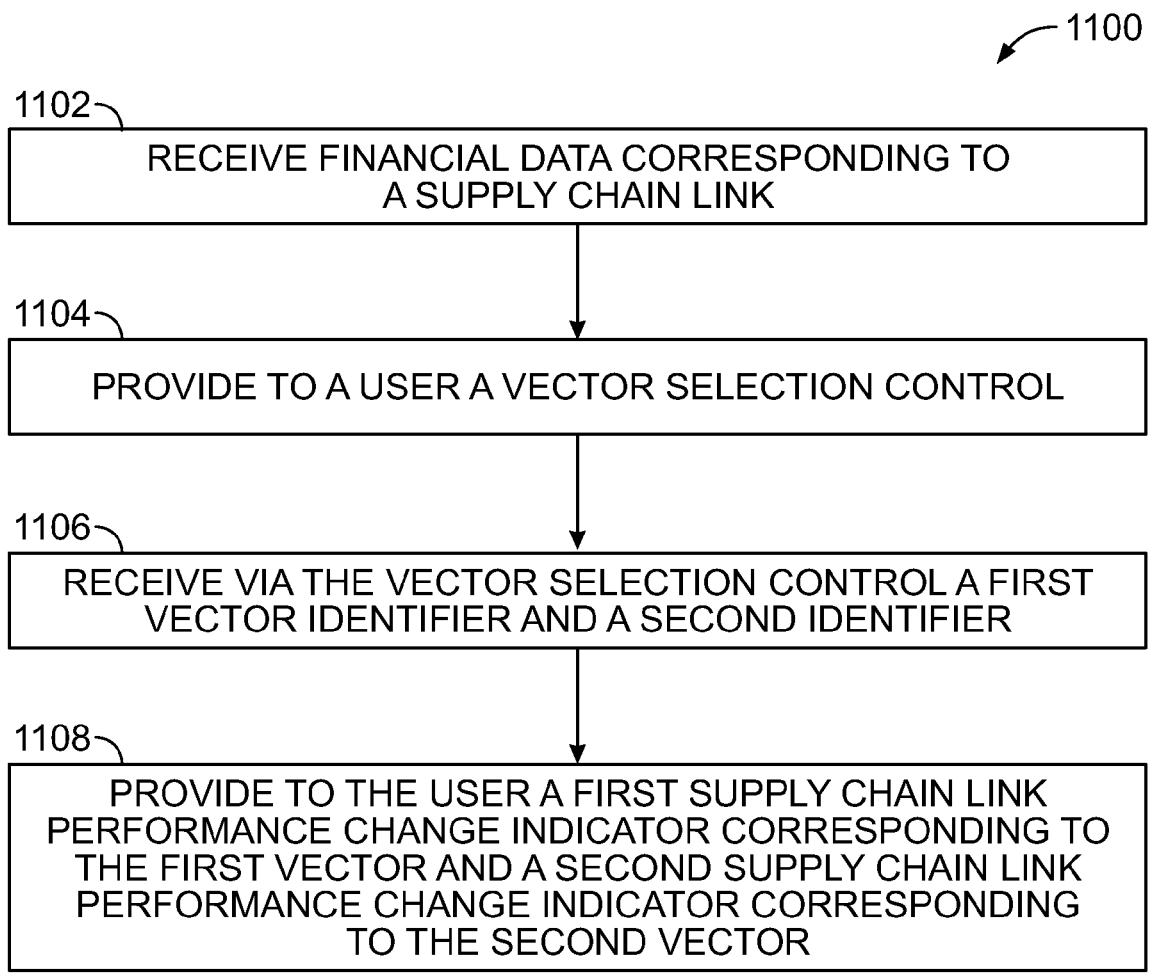
FIG. 11 shows illustrative elements of a process in accordance with the principles of the invention.

FIG. 11 shows illustrative process 1100 for providing a supply chain link performance change indicator. Process 100 may begin at step 1102. At step 1102, the system may receive financial data corresponding to a supply chain link. At step 1104, the system may provide to a user a vector selection control. At step 1106, the system may receive via the vector selection control a first vector identifier and a second vector identifier. At step 1108, the system may provide to the user a first supply chain link performance change indicator corresponding to the first vector and a second supply chain link performance change indicator corresponding to the second vector.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for providing a supply chain link performance change indicator have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for providing a supply chain link performance change indicator, the apparatus comprising:
   a processor module including hardware that is configured to provide to a user a vector selection control and to formulate a margin vector by normalizing elements $AR_i$ of a third vector of the plurality of vectors to corresponding elements $R_i$ of a fourth vector of the plurality of vectors wherein each element $m_i$ of the margin vector is computed as $AR_i/R_i$;
   a receiver module including hardware that is configured to:
      receive financial data corresponding to the supply chain link, the financial data including a plurality of vectors; and
      receive via the vector selection control a first vector identifier corresponding to a first vector in the plurality of vectors and a second vector identifier corresponding to a second vector in the plurality of vectors; and
   an output device that is configured to provide to the user a first supply chain link performance change indicator corresponding to the first vector and a second supply chain link performance change indicator corresponding to the second vector and a margin change vector having elements representing changes between elements $m_i$ of the margin vector, the margin change vector having elements $M_i=(m_i-m_{i-1})/m_{i-1}$.

2. The apparatus of claim 1 wherein:
   the receiver is further configured to receive from the user a magnitude threshold;
   the output device is further configured to provide to the user:
      a financial data vector magnitude filter control; and
      a subset of the financial data that exceeds the magnitude threshold.

3. The apparatus of claim 2 wherein:
   the output device is further configured to provide to the user a financial data vector rate filter control;
   the receiver is further configured to receive from the user a rate threshold; and
   the processor is further configured to remove from the subset financial data that does not exceed the rate threshold.

4. The apparatus of claim 3 wherein the output device is further configured to provide to the user:
   an income statement analysis control; and,
   in response to receiving from the user an instruction to present income statement data, a change index that corresponds to a supply chain link financial change between a first time period and a second time period.

5. The apparatus of claim 1 wherein the receiver is further configured to receive from the user a selection identifying the fourth vector.

6. The apparatus of claim 1 wherein the fourth vector is a revenue vector.

7. The apparatus of claim 1 wherein the first vector is the same as the fourth vector.

8. One or more computer-readable media storing computer-executable instructions which, when executed by a processor on a computer system, perform a method for providing a supply chain link performance change indicator, the method comprising:
   receiving financial data corresponding to the supply chain link, the financial data including a plurality of vectors;
   providing to a user a vector selection control;
   receiving via the vector selection control a first vector identifier corresponding to a first vector in the plurality of vectors and a second vector identifier corresponding to a second vector in the plurality of vectors;
   providing to the user a first supply chain link performance change indicator corresponding to the first vector and a second supply chain link performance change indicator corresponding to the second vector;
   formulating a margin vector by normalizing elements $AR_i$ of a third vector of the plurality of vectors to corresponding elements $R_i$ of a fourth vector of the plurality of vectors wherein each element $m_i$ of the margin vector is computed as $AR_i/R_i$; and providing to the user a margin change vector having elements representing changes between elements $m_i$ of the margin vector, the margin change vector having elements $M_i=(m_i-m_{i-1})/m_{i-1}$.

9. The media of claim 8 wherein the method further comprises:
providing to the user a financial data vector magnitude filter control;
receiving from the user a magnitude threshold; and
providing to the user a subset of the financial data that exceeds the magnitude threshold.

10. The media of claim 9 wherein the method further comprises:
providing to the user a financial data vector rate filter control;
receiving from the user a rate threshold; and
removing from the subset financial data that does not exceed the rate threshold.

11. The media of claim 10 wherein the method further comprises:
providing to the user an income statement analysis control;
in response to receiving from the user an instruction to present income statement data, providing to the user a change index that corresponds to a supply chain link financial change between a first time period and a second time period.

12. The media of claim 11 wherein the method further comprises:
formulating an actual change vector by calculating differences between elements of the third vector of the plurality of vectors; and
providing to the user the actual change vector, the actual change vector including the change index.

13. The media of claim 12 wherein the method further comprises receiving from the user a selection identifying the third vector.

14. The media of claim 12 wherein, in the method, the first vector is the same as the third vector.

15. A method for providing a supply chain link performance change indicator, the method comprising:
using a receiver, receiving financial data corresponding to the supply chain link, the financial data including a plurality of vectors;
using a processor, providing to a user a vector selection control and formulating a margin vector by normalizing elements $AR_i$ of a third vector of the plurality of vectors to corresponding elements $R_i$ of a fourth vector of the plurality of vectors wherein each element $m_i$ of the margin vector is computed as $AR_i/R_i$;
using the receiver, receiving via the vector selection control a first vector identifier corresponding to a first vector in the plurality of vectors and a second vector identifier corresponding to a second vector in the plurality of vectors; and
using an output device, providing to the user a first supply chain link performance change indicator corresponding to the first vector and a second supply chain link performance change indicator corresponding to the second vector and a margin change vector having elements representing changes between elements $m_i$ of the margin vector, the margin change vector having elements $M_i=(m_i-m_{i-1})/m_{i-1}$.

16. The method of claim 15 further comprising:
using the output device, providing to the user a financial data vector magnitude filter control;
using the receiver, receiving from the user a magnitude threshold; and
using the output device, providing to the user a subset of the financial data that exceeds the magnitude threshold.

17. The method of claim 16 further comprising:
using the output device, providing to the user a financial data vector rate filter control;
using the receiver, receiving from the user a rate threshold; and
using the processor, removing from the subset financial data that does not exceed the rate threshold.

18. The method of claim 17 further comprising:
using the output device, providing to the user an income statement analysis control; and,
in response to receiving from the user an instruction to present income statement data, providing to the user a change index that corresponds to a supply chain link financial change between a first time period and a second time period.

19. The method of claim 18 further comprising:
using the output device, formulating a relative change vector by calculating relative differences between elements of the third vector of the plurality of vectors; and using the output device, providing to the user the relative change vector, the relative change vector including the change index.

20. The method of claim 19 further comprising using the receiver to receive from the user a selection identifying the third vector.

21. The method of claim 19 wherein the first vector is the same as the third vector.

\* \* \* \* \*